May 25, 1937.  E. W. TERHUNE  2,081,388
SASH OPERATING MECHANISM
Filed Jan. 12, 1933  4 Sheets-Sheet 1
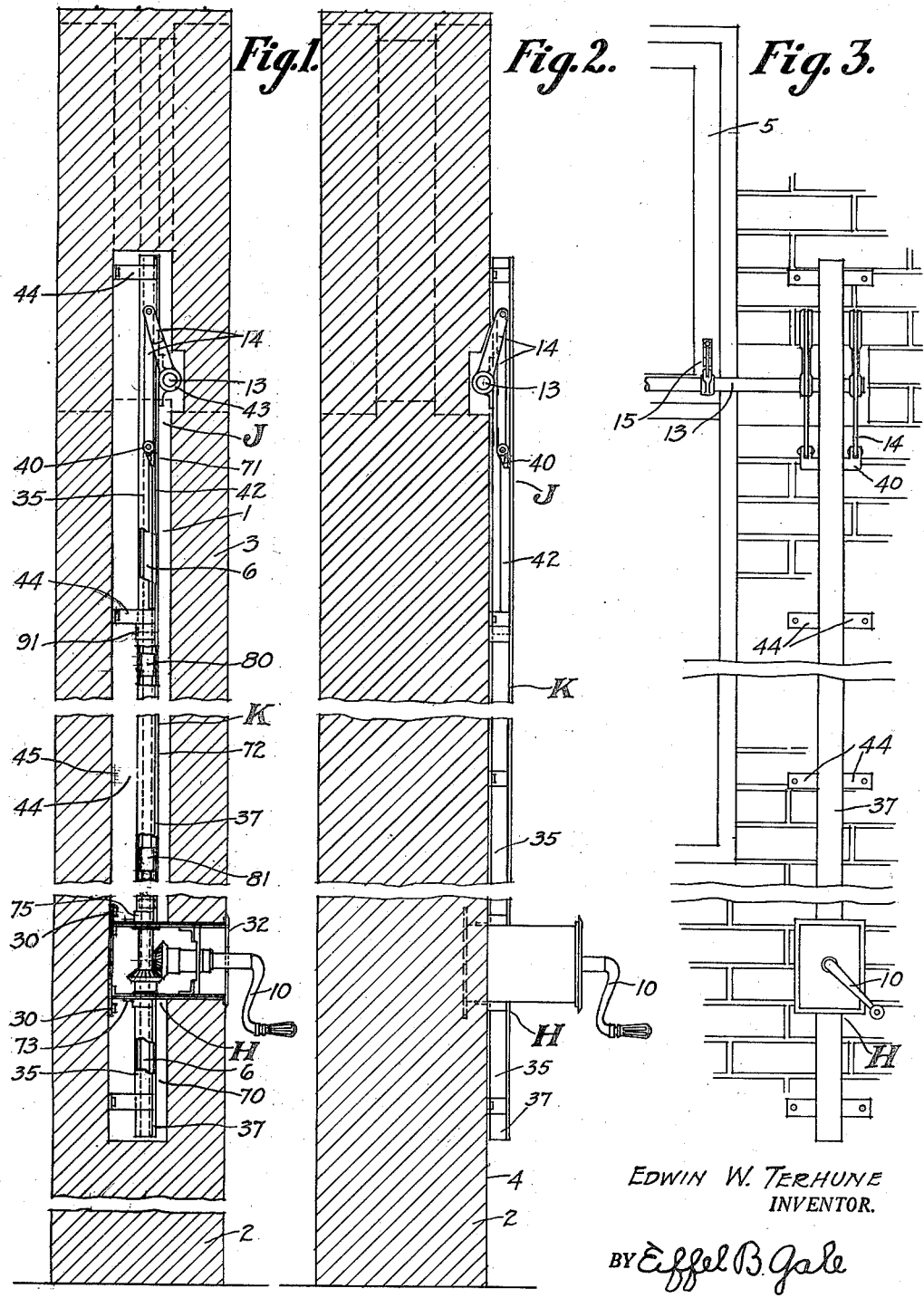
EDWIN W. TERHUNE
INVENTOR.
BY Effel B. Gale
ATTORNEYS.

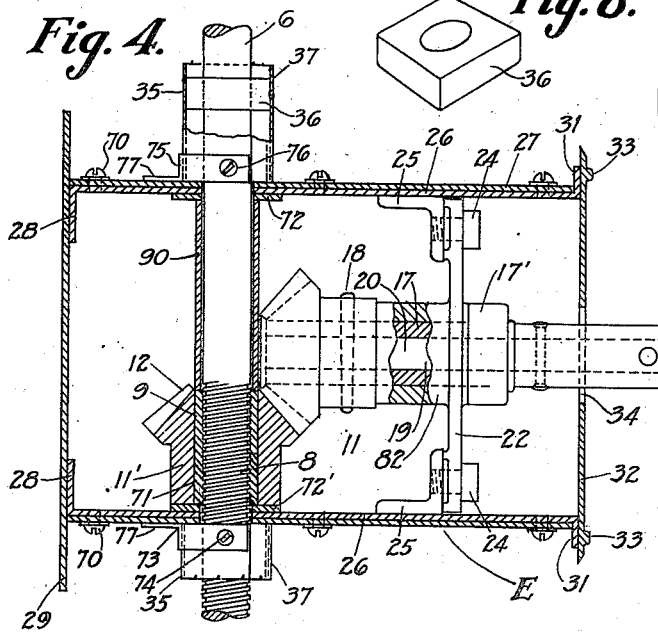
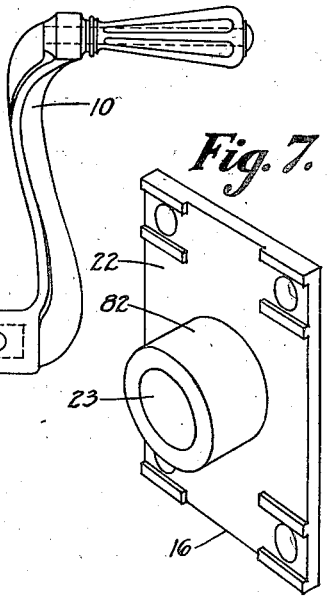
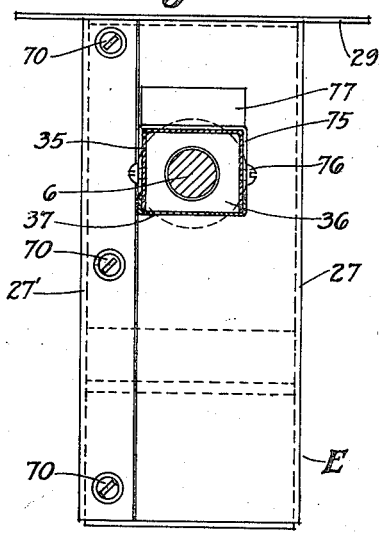
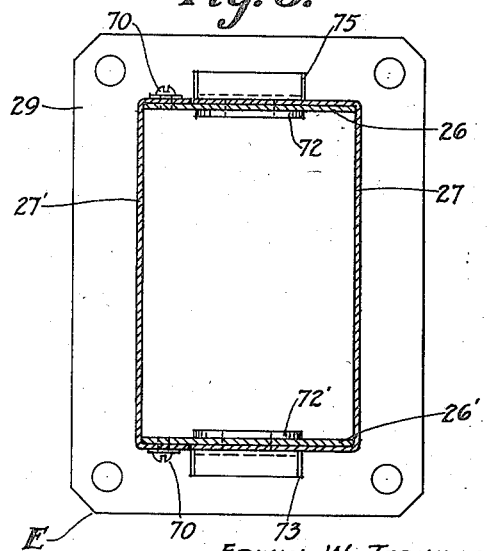

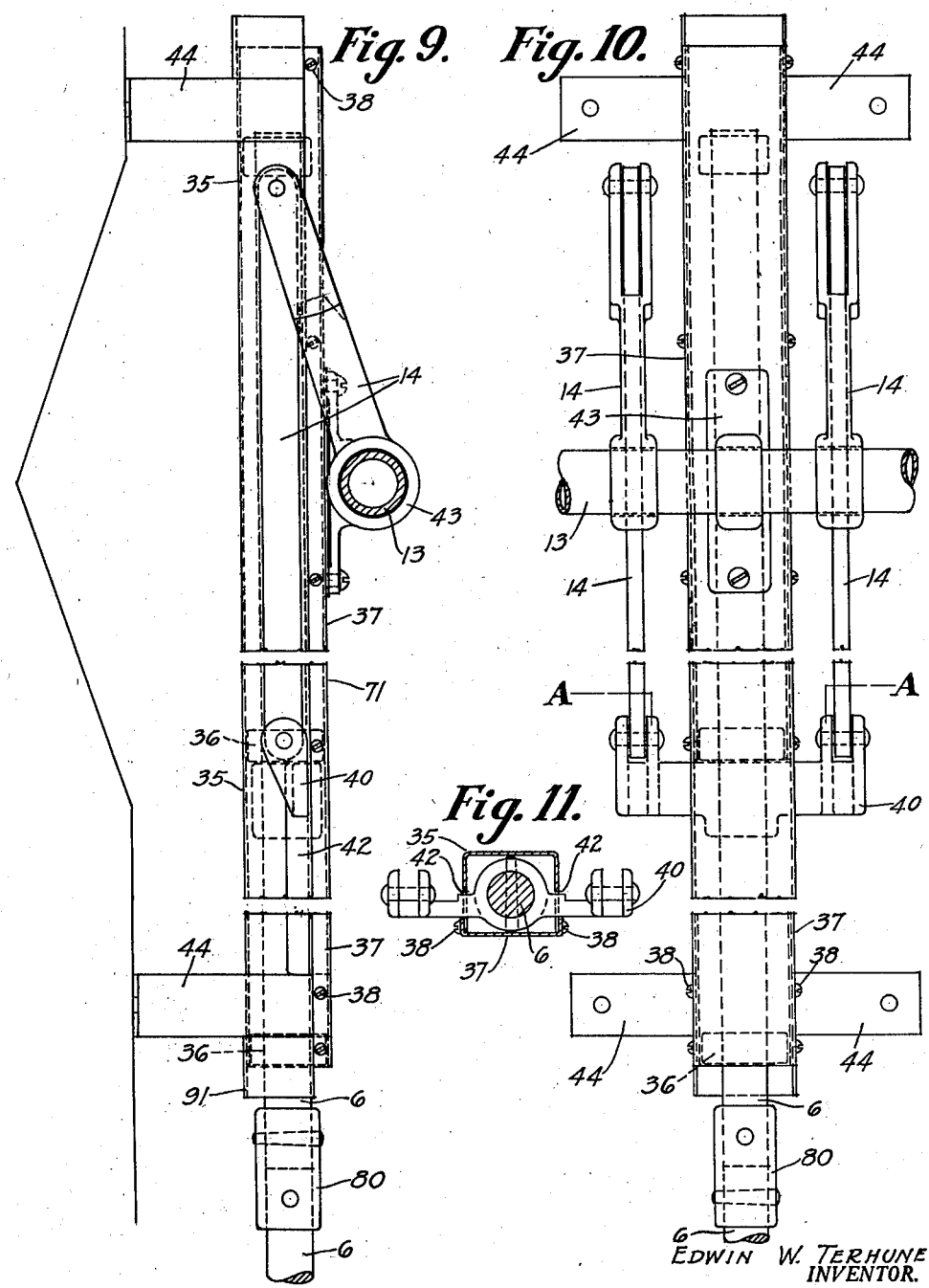

May 25, 1937.  E. W. TERHUNE  2,081,388
SASH OPERATING MECHANISM
Filed Jan. 12, 1933  4 Sheets-Sheet 4
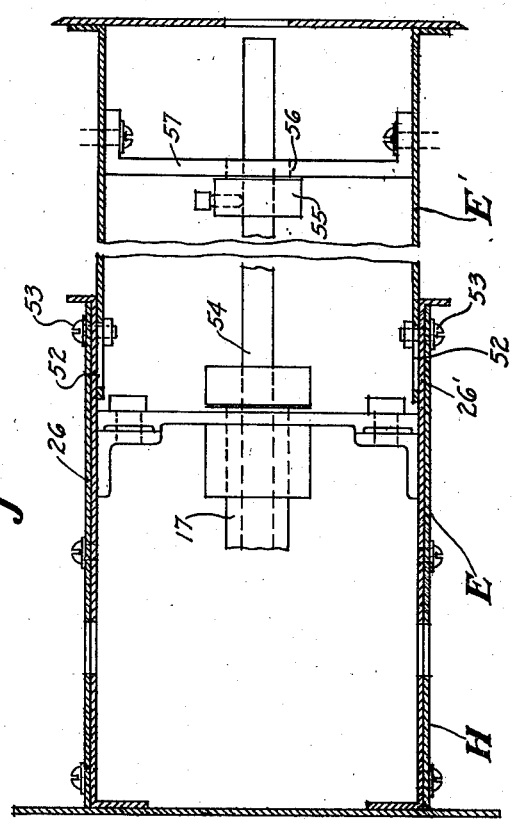
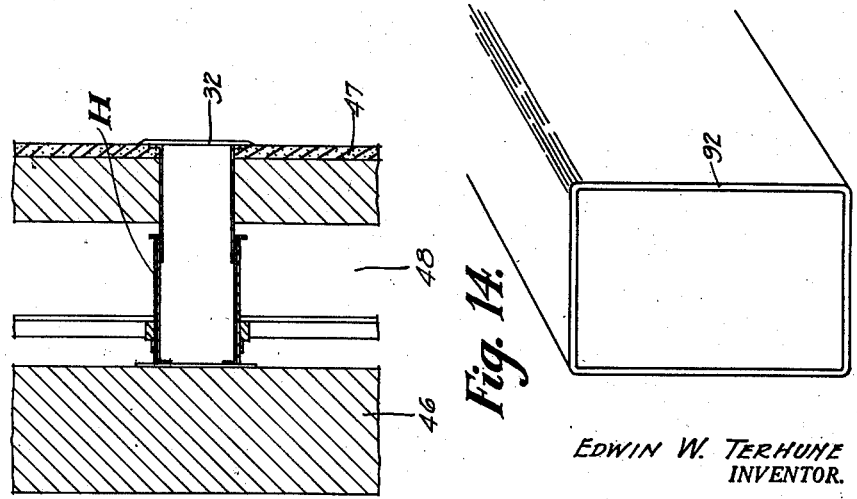
EDWIN W. TERHUNE
INVENTOR.
BY Effel B. Gale
ATTORNEYS.

Patented May 25, 1937

2,081,388

UNITED STATES PATENT OFFICE 2,081,388

SASH OPERATING MECHANISM

Edwin W. Terhune, Bethel, Conn.

Application January 12, 1933, Serial No. 651,376

2 Claims. (Cl. 268—24)

This invention relates to sash operating mechanism and more particularly to improvements incident to the concealment and installation of said mechanism.

In the past, attempts have been made to conceal the sash operating mechanism, but they may be termed "make-shift" because they have not been of a nature to overcome numerous practical difficulties frequently encountered at the site of installation and the results are unsatisfactory and not in accordance with good practice.

Various conditions and ensuing difficulties frequently encountered at the site will now be enumerated, viz:—It is essential in order to obtain proper operation of the sash that the hand or power operated substantially vertical rod be kept in proper alignment and to do so according to prior practice entails the use of a multiplicity of fittings and difficulty is encountered in attaching said fittings to the wall at the required positions. Furthermore, it often happens that the wall is out of plumb, and in such case, cutting or packing is resorted to, and aside from the time and expense involved, the result is unsightly and unsatisfactory.

It is common practice to conceal the equipment in masonry, but past practice has not recognized the desirability of an improved construction as provided by the present invention for preventing clogging of the equipment by loose plaster when walling in, and accumulating dust and dirt in use, and at the same time permitting easy access to the equipment for the purpose of making proper adjustments, lubricating the gears and replacing same or any part thereof most liable to wear out through use. Clogging of the gears by loose plaster when walling in cannot be detected and the result is that the equipment is rendered unworkable when such loose plaster hardens and this condition necessitates cutting away the finished wall to obtain access to the parts affected.

The operating gear, or to be more specific, the vertical power transmitting rod, and the shaft to be operated, must of necessity be kept in proper relation and hence it is desirable that supporting means be arranged to maintain proper relation with greatest accuracy. When it is necessary to attach hangers for the support of the sash to the wall without direct connection to the power operated rod, the problem of obtaining the desired accuracy becomes more aggravated particularly if the walls are of masonry in which case considerable difficulty is experienced in setting the fastenings or bolts for the hangers in an exact position such as is required to obtain the necessary accuracy.

According to past practice, adjustments and fittings are made at the site of installation and the accompanying cost is excessive and the results are often unsatisfactory.

Sash operating equipment exposed on the face of the wall presents an unsightly and unsatisfactory appearance and since, according to past practice, the vertical power transmitting rod is guided by a multiplicity of fittings, in order that such rod may easily be moved in operation.

In the operation of sash, good practice dictates that the operated shaft should be kept as close as possible to the sash and window frames. Past requirements to meet this condition involve a depth of chase difficult to secure and at the same time maintain the necessary strength in the supporting wall.

The objects of the invention are summarized as follows, to wit; to provide, first, means for concealing the sash operating mechanism, having novel features of construction and arrangements of parts to over-come in a most novel, practical and economical manner the aforesaid enumerated conditions and difficulties; second, concealing means for the sash operating mechanism certain portions of which together with certain portions of the sash operating mechanism may be assembled at the factory, said concealing mechanism embodying flexible means which may form an integral part thereof for attaching it to the wall; third, means constructed and arranged so that the concealing mechanism supports one end of the shaft to be operated; fourth; a concealing mechanism embodying a construction which permits ready access to and removal of the operating gears, and enables the operating mechanism, and parts to be operated, to be so co-related in a manner strictly in accordance with good practice as when certain structural conditions are encountered at the site of installation.

Other objects will be set forth hereinafter, the novel combinations and arrangements of parts being set forth in the appended claims.

In the accompanying drawings:

Fig. 1 illustrates in sectional elevation and in general arrangement, a concealing mechanism for the sash operating mechanism constructed and arranged in accordance with the present invention as installed within a walled in chase;

Fig. 2 illustrates in sectional elevation and in general arrangement, the concealing mechanism installed on the face of the wall;

Fig. 3 is a front elevational view of Fig. 2;

Fig. 4 is a somewhat enlarged side elevational view of that portion of the mechanism which conceals the operating gears, certain parts being in section;

Fig. 5 is a cross sectional front elevational view of the mechanism which conceals the operating gears;

Fig. 6 is a plan view of the mechanism which conceals the operating gears, together with the concealing mechanism illustrated in cross section for the power transmitting rod;

Fig. 7 illustrates in perspective a view of a bearing support for one of the bevel gears;

Fig. 8 illustrates in perspective a type of guide for the power transmitting rod;

Fig. 9 illustrates a side elevational view of the upper portion of the sash operating mechanism, and concealing mechanism therefor together with a bearing support as arranged for the shaft to be operated, and illustrates also an operating connection between said shaft to be operated and the vertically standing power transmitting rod;

Fig. 10 illustrates a front elevational view of Fig. 9;

Fig. 11 illustrates a cross sectional plan view of Fig. 10, taken on the line A—A;

Fig. 12 is a fragmentary sectional elevation and general arrangement of a certain portion of the concealing mechanism of modified construction, as arranged for a building construction of modified arrangement;

Fig. 13 is an enlarged sectional plan view of said concealing mechanism of modified form, together with certain parts of the operating mechanism, and Fig. 14 illustrates in perspective a concealing mechanism of modified construction for the operating gears.

It is common practice to install the operating mechanism for sash within a chase 1 in a masonry wall 2 as illustrated in Fig. 1 in which case said mechanism is walled in as by a masonry wall 3. In other instances it is installed on the face 4 of the wall 2 as illustrated in Fig. 2.

The operating mechanism for the sash 5 may be of any well known construction operable either by hand or power and the type herein illustrated is merely an example.

The operating mechanism, or to be more specific, that portion of it which by the present invention is concealed, consists of the substantially vertical power transmitting rod 6 which may be made up of a number of sections coupled together. The lower section of the rod 6 is provided with threads 8 engageable by a rotatable nut 9 adapted for rotation either by a power device (not shown) or by a hand lever 10 through the intermediary of bevel gearing 11.

The rotatable nut 9 is in the form of a bushing for the bevel gear 11' and is preferably made of bronze. The nut is provided with interior threads 12 which engage the threads 8 on the rod.

Rotation of the threaded nut causes axial movement of the rod 6 and such movement is transmitted to the shaft to be operated, designated 13, by a suitable link connection 14 which converts limited axial movement of the rod 6 into limited rotary movement thus to cause limited rotary movement of the shaft 13 which through suitable operating connections such as 15 is transmitted to the sash 5 to move same to open or closed position depending on the direction of rotation of the hand lever.

According to the present invention it is proposed to provide a mechanism to conceal that portion of the operating mechanism which consists of the operating gears and associated supports, together with the vertical power transmitting rod and guides therefor, and the construction and arrangement is such as to enable lower and upper parts H and J respectively to be assembled at the factory whereat necessary adjustments may be made. An intermediary part K joins said lower and upper parts H and J, and the elements which make up the same may be cut to fit at the site of installation.

Such construction and arrangement consists of a casing somewhat rectangular in form and as a whole designated E (see Figs. 4, 5 and 6) in which the operating gears are encased together with a readily removable bearing support 16 for the vertically disposed bevel gear, the latter being attached by a tapered pin 18 to a spindle 17 engaging said bearing support and having a head 17' which serves as a stop.

The spindle is provided with a squared opening 19 engageable by a squared shank 20 which may form a part of the hand operated lever 10.

The bearing support, see Fig. 7, is in the form of a rectangular plate 22 having the central hub portion 82 provided with a bore 23 to receive the spindle 17. The bearing support is maintained in a fixed position inside of the casing by means of four threaded tap bolts 24 which engage threaded holes in supporting angles 25.

The casing E is made up of a pair of metal plates 27 and 27' bent and joined as indicated in Fig. 5 to form an open ended body rectangular in shape. Inner plates 26 and 26' are welded to the inner face of the plate 27, and the plate 27' overlaps said inner plates and is secured thereto by screws 70. The inner plates 26 and 26' at the rear end are bent as at 28 to provide feet to which a metallic plate 29 is suitably secured as for example by being welded thereto to form a back for the casing. The plate 29 is attached to the wall by bolts 30. The inner plates 26 and 26' are bent as at 31 to provide a seat to which a removable front cover plate 32 is attached by screws 33. The cover plate is provided with an opening 34 through which the squared shank of the hand lever passes to engage the squared hole in the spindle 17.

A section of metal tubing 70 abuts against the top face of the nut 9. Said sections of tubing also abut against washers 72 and 72' which may be welded to the inner faces of the plates 26 and 26' respectively. This construction and arrangement prevents thrust movement of the rotatable nut 9 during its working movement.

According to a modified construction as illustrated in Fig. 14, the outer portion of the casing instead of being made up of two pieces, may consist of a single piece of metal tubing designated 92.

This construction and arrangement for concealing the gears prevents clogging of same by loose plaster as when the equipment is walled in, and permits access to the gears readily for the purpose of lubrication; adjustment or replacement of the parts simply by removal of the cover plate 32 and bearing support 16.

The bearing support 16 and the vertical gear can be removed intact by removal of the bolts 24.

The concealing mechanism for the vertical power transmitting rod 6 consists of metal channels 35 made up in sections and inside of which are fastened suitable guides 36 for the rod 6.

With this arrangement the metal casing, by its rigidity, gives added strength to the rod 6 to keep it in proper alignment and hence the number of guides or fittings required are considerably reduced in number. Furthermore, since the guides are inside the channel the difficulty heretofore encountered in attaching necessary guides in the bottom of the chase or to the face of the wall is entirely overcome with a consequent saving in time, labor and expense. Furthermore a reduction in the number of guides results in a corresponding decrease in friction which enables operation of the mechanism with greater ease and results in longer life for the operating parts.

Another past difficulty overcome by this construction is, that it eliminates having to cut or pack in order to make attachments of the guides to the wall particularly in instances where the wall is out of plumb.

The channel sections are provided with removable metallic cover plates 37 which overlap same and are secured thereto by screws 38.

As will be observed from Fig. 1, the concealing mechanism for the power transmitting rod is made up of the lower section 70, and upper section 71, and an intermediate section 72.

The lower section fits into a suitable socket such as 73 to which it is attached by a set-screw 74.

The intermediate section 72 at its lower end fits into a similar socket 75 to which it is attached by a machine screw 76.

Said sockets 73 and 75 are each provided with a lip 77 which serve as a means of attaching same to the casing as for example by a welding operation.

The intermediate section 72 at its upper end is united with the lower end of the upper section 71 by a socket 81.

A yoke (see Figs. 9, 10 and 11) such as 40, for example, is pinned to the power transmitting rod 6 and connects with links 14 of the operating mechanism. In order to accommodate said yoke and to permit proper reciprocal vertical working movement thereof suitable slots such as 42 are provided in the channel 35.

It is necessary that the power transmitting rod 6 and the line shafts or operated shaft 13 should be maintained in proper relation with the greatest accuracy. To do so according to the present invention, a bearing support 43 for said shaft 13 is attached directly to the concealing mechanism, either on the front or back of same as conditions may warrant. This is one of the important features of this invention. In the former case the bearing support 43 is attached to the cover plate 37 as shown in full lines in Fig. 9, and in the latter case to the back face of the channel 35 as indicated in dotted lines in Fig. 9. This arrangement assures proper alignment of the two shafts mentioned, a result which according to past practice is very difficult of attainment.

The intermediate and upper sections of the assembly are supported preferably by metal straps 44 arranged in pairs. These straps may be welded to or otherwise suitably secured to the channels at suitably spaced distances. These straps are relatively light in weight and preferably flexible so as to be easily bent as may be required in order to compensate for the base of the chase or the face of the wall being out of plumb and with the view of making attachment of the unitary structure as by bolts 45 in a manner so that the bearing 43 will be properly aligned with the operated line shaft 13.

With the construction and arrangement thus far described, the lower part of the equipment designated H and which comprises the operating gears and threaded rod together with the concealing mechanism therefor which includes the gear casing and the lower section 70 may be all assembled at the factory and properly adjusted there so that in effect it is a unitary structure. This is also one of the important features of the present invention.

The upper part of the equipment designated J and which comprises the upper section of the rod together with the bearing support 43 links etc. which connect with the shaft 13 to be operated, and the concealing mechanism for said upper section of the rod may likewise be assembled and properly adjusted at the factory so as to form a unitary structure.

By enabling these parts to be so assembled and adjusted at the factory very decided advantages accrue in that proper operation of the equipment is assured and the cost of installation is kept at a minimum and as compared with past practice is greatly reduced, because as will be particularly noted the only labor involved at the site involves attaching the gear casing to the wall by the four bolts provided for the purpose, also attaching the upper section to the wall as by bolting the straps in place and these straps may be easily bent if necessary to properly align the shaft 13 with the bearing support 43 therefor which is a part of the concealing mechanism, and the intermediate section of the power transmitting rod together with its concealing mechanism is properly fitted and set in place and said intermediate section of rod is then coupled with the upper and lower sections and a single set of fastening straps may be sufficient to support the intermediate portion 72 of the concealing mechanism for attachment to the wall. The couplings which connect the intermediate section of the rod 6 with the upper and lower sections of said rod are designated 80 and 81, see Figs. 1 and 9.

We come now to a modified arrangement and construction illustrated in Figs. 12 and 13.

With this arrangement the particular type of building construction is such as to require in the interest of good practice the attachment of the concealing mechanism H for the operating gears (not shown) to the face of a wall 46 concealed by a front wall 47 there being a substantial air space 48 intermediate the two walls. This arrangement as will be clear to those skilled in the art enables the operated shafts (not shown) to be kept close to the sash (not shown) which is considered good practice.

With the concealing mechanism so arranged in connection with the building structure as illustrated, it is desirable to permit access to the gearing and for this purpose a casing E' is provided which forms an extension of the casing E and penetrates the wall 47 so that the cover plate 32 is exposed on the face of said wall 47.

The extensible casing E' is illustrated more particularly in Fig. 13 and it connects with the casing E, a portion of which is shown, by what is in effect, a slot and pin connection 51 said casing E' being telescoped by the inner plates 26 and 26' of the casing E and being provided with the slots 52 which engage the shank portion of screws 53.

A square core 54 connects with the spindle 17 on which the vertically disposed bevel gear (not shown) is supported.

A stop collar 55 is attached to the core and has an extension 56 which engages an opening in a bracket 57 which forms a bearing support for said core. With this arrangement the hand operated lever as for example as illustrated in Fig. 8 is not provided with the squared core but only with a squared hole to engage the core 54.

Various modifications in details of construction and arrangements of parts will suggest themselves to those skilled in the art and I do not therefore wish to be limited to precise details and arrangements as shown.

What I therefore claim and desire to secure by Letters Patent is:

1. In combination, means for operating pivoted sash comprising a substantially vertical power transmitting rod and gearing for imparting lineal movement thereto, concealing mechanism for said gearing comprising a metallic casing substantially rectangular in shape and having a removable cover plate, a bearing support removably attached inside of said casing, for part of said gearing, concealing mechanism for said rod comprising a channel shaped metallic member and a removable cover for said member, a shaft to be operated by said rod, a yoke connected to said rod, links operatively connecting said yoke with said shaft to be operated, slots in said channel shaped member engageable by said yoke to permit working movement thereof, and a bearing support for said shaft to be operated, adapted for attachment either to said removable cover for said channel shaped member, or to the back face of said channel shaped member.

2. In combination, means for operating pivoted sash comprising a power transmitting rod, gearing to operate said rod, and concealing mechanism for said gearing comprising casings, one having a removable cover, said casings telescoping and being operatively connected by a slot and pin connection to permit adjustment of the overall length thereof within predetermined limits.

EDWIN W. TERHUNE.